United States Patent Office 3,395,510
Patented Aug. 6, 1968

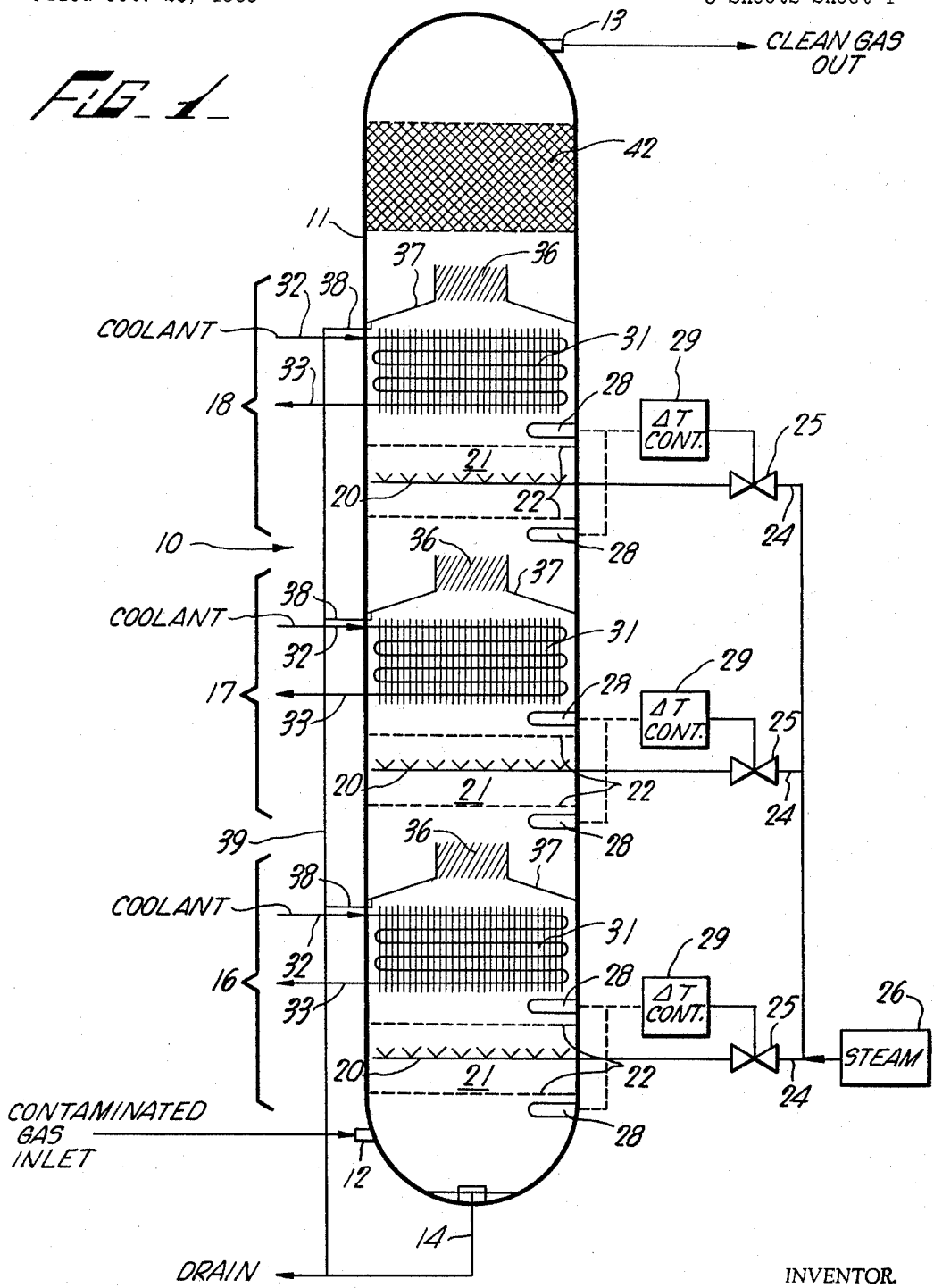

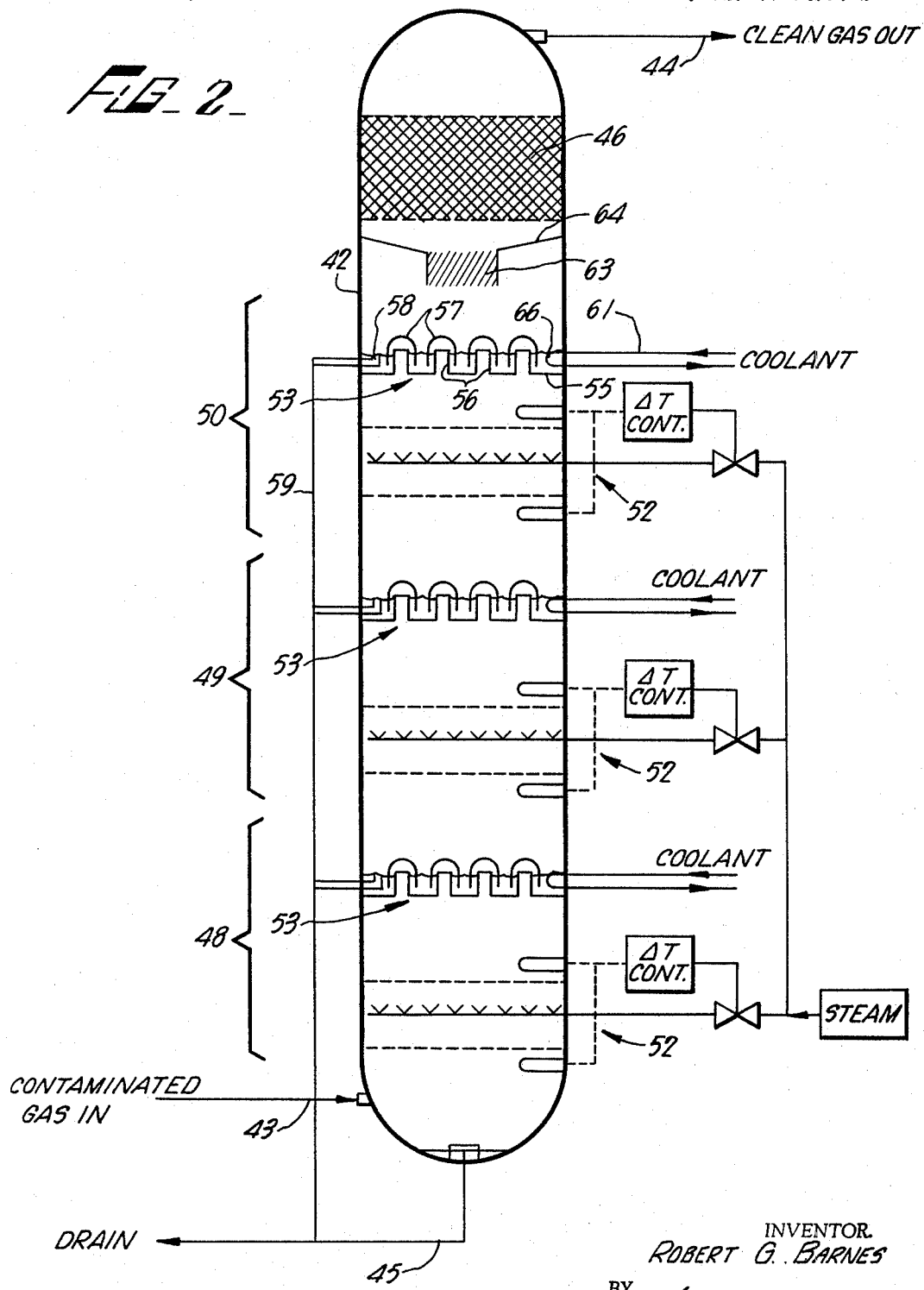

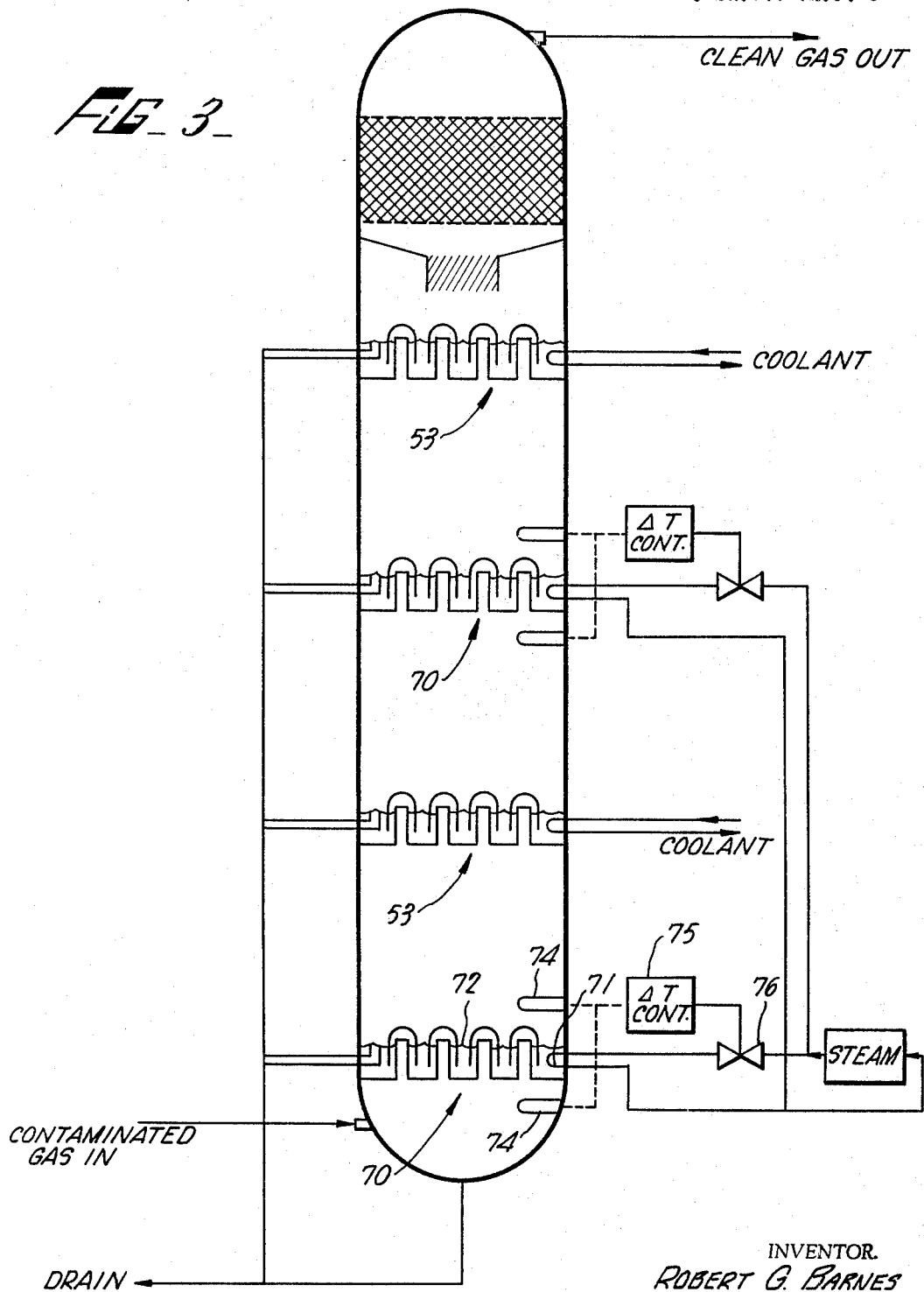

3,395,510
GAS SCRUBBER
Robert G. Barnes, Saratoga, Calif., assignor to General Electric Company, New York, N.Y., a corporation of New York
Filed Oct. 23, 1965, Ser. No. 503,961
9 Claims. (Cl. 55—20)

This invention relates to a method and apparatus for removing minute particles of matter from a gas.

Several methods are presently used to remove or filter unwanted particulate matter from a gas. The most common technique involves imparting a motion to the gas whereby particles suspended in the gas impinge on and are retained by a solid or liquid removal medium which allows the filtered gas to pass. This impingement technique is basic to conventional bag filters and other devices such as cyclone separators.

While impingement methods are very useful in many applications, the filtering efficiency of this technique depends to a large extent on the inertia and, therefore, the mass of the particles to be removed. Filtering by impingement becomes increasingly difficult as particle size becomes smaller than about one micron, and is usually unsatisfactory for particles smaller than about one-tenth micron.

Another filtering method uses an electrostatic precipitator which applies an electrical charge to particles which are then collected on an electrode. This technique is especially useful with very small particles which cannot be captured by conventional impingement methods. However, the collected particles are held on an electrode in close proximity to the stream of gas which is being filtered. Momentary loss of electric power to the electrostatic precipitator not only halts particle collection, but may allow the previously accumulated particles to be swept away by the gas stream.

This sensitivity to power failure poses a reliability problem in certain critical applications. For example, in a plant which processes radioactive materials, it is usually necessary to remove radioactive particles from a gas stream before the gas can be safely released to the atmosphere. Many such particles may be too small to be removed efficiently by conventional impingement methods. These particles can be collected by an electrostatic precipitator, but there remains the hazard of release of a burst of radioactive particles in the event of power failure. Cleaning of the precipitator also poses the hazard of a spreading of contamination.

The gas scrubbing method and apparatus of this invention provide efficient removal of very small particles, and overcome the deficiencies in existing filters. The particles to be removed from the gas stream are employed as condensation nuclei, around which are formed droplets of liquid. Each droplet is much larger than the entrained particle which serves as a condensation nucleus, and the droplet can be removed from the gas stream by conventional impingement techniques.

Stated another way, the invention contemplates increasing the effective size of very minute particles to the point where efficient capture by conventional filters becomes possible. Use of impingement techniques is thus made possible with sub-micron-size particles, and the need for an electrostatic precipitator with its attendant drawbacks is eliminated.

Briefly stated, the gas scrubber of this invention comprises a closed vessel having an inlet opening to admit particle-contaminated gas, and an outlet opening to deliver scrubbed gas. Mixing means are disposed between the inlet and outlet openings for mixing a condensable vapor with the gas. Cooling means are disposed between the mixing means and the outlet opening for cooling the mixed gas and vapor whereby the vapor condenses in droplets around the particles which serve as condensation nuclei. Filter means are disposed between the cooling means and the outlet opening for filtering the gas to remove the droplets and the particles entrained in them.

In a preferred form of the invention, a plurality of serially arranged gas-scrubbing stages are provided in the vessel, each stage having mixing means, cooling means, and filter means. Steam is a suitable condensable vapor for use with the invention, and may be mixed with the gas by mixing means comprising a steam injector. Preferably, temperature-sensing means are provided to determine the gas temperature before and after steam injection, and the temperature measurements thus obtained are used to control a valve which increases or decreases the amount of steam fed to the injectors.

In terms of a method for removing particles from a gas, the invention comprises the steps of mixing a condensable vapor with the gas, cooling the gas to supersaturate it with the vapor whereby at least some of the vapor condenses in droplets around the particles which serve as condensation nuclei, and removing the droplets and particles entrained therein from the gas.

The invention will be further explained with reference to the accompanying drawings, in which:

FIG. 1 is a schematic elevation of the gas scrubber of this invention;

FIG. 2 is a schematic elevation of an alternative form of the invention; and

FIG. 3 is a schematic elevation of another alternative form of the invention.

Referring to FIG. 1, a gas scrubber 10 of this invention is housed in a vertically elongated closed vessel 11. The lower end of the vessel has an inlet line 12 to admit a particle-contaminated gas. The upper end of the vessel has an outlet line 13 to deliver scrubbed gas. A drain line 14 extends through and is secured to the bottom of the vessel.

In a preferred form of the invention, a plurality of serially arranged stages are disposed in the vessel between the inlet and outlet openings. In FIG. 1, three such stages 16, 17 and 18 are shown, each stage having means for accomplishing humidification, condensation and filtering.

Each stage includes a steam injector 20 for introducing steam into a humidification zone 21 between a pair of baffles or perforated plates 22 disposed across the vessel interior on opposite sides of the steam injector. Each steam injector is fed by a supply line 24 which includes a valve 25. The several supply lines are manifolded together to be fed from a common steam supply 26.

Each stage also includes a pair of temperature sensors 28 such as thermocouples which are disposed on opposite sides of the humidification zone defined by perforated plates 22. Each pair of temperature sensors is connected to a conventional differential-temperature controller 29. Each controller is connected to valve 25 in its respective stage whereby the valve setting is determined by the controller.

Each stage further includes a cooling section 31 which may be of the conventional finned type. The cooling section is disposed within the vessel above the humidification zone of its respective stage. The cooling section includes an inlet line 32 and an outlet line 33 through which a coolant may be circulated.

Disposed above the cooling section in each stage is a mesh demister 36 which may be of the conventional type. The demister is suspended in the center of the vessel by an annular shield 37 which slopes upwardly and inwardly from the inner surface of the vessel toward the demister. A drain line 38 extends from the lower edge of the shield through the wall of the vessel. The drain lines of the several sections are connected to a downcomer 39 which is in turn connected to drain line 14 at the bottom of the vessel.

The three stages are serially arranged with stage 16 at the lower end of the vessel, stage 17 in the center of the vessel, and stage 18 at the upper end of the vessel. Between the top of stage 18 and outlet line 13, a filter 42, preferably of the compressed-glass-fiber or metallic-mesh type, is disposed across the interior width of the vessel.

In operation of the gas scrubber, a contaminated, particle-laden gas is delivered under pressure to inlet line 12 at the lower end of the vessel. The gas flows upwardly in the vessel to circulate through humidification zone 21 in the first stage. Steam is introduced and mixed with the gas in the humidification zone by injector 20.

The degree of humidification is monitored by measuring the gas temperature before and after injection of steam. These temperatures are sensed by sensors 28, and the resulting differential-temperature information is processed by controller 29 to operate valve 25, increasing or decreasing the amount of steam injected into the gas. Perforated plates 22 at the top and bottom of the humidification zone promote thorough mixing of the gas and steam, and tend to eliminate localized hot spots which might interfere with accurate temperature sensing.

The humidified gas then flows upward in the vessel to flow over the finned cooling section. The gas becomes supersaturated as it is cooled, and water vapor condenses in droplets around the particulate matter which is to be removed from the gas. The degree of supersaturation is partly determined by the extent to which the gas is cooled. For example, cooling saturated gas from 150° F. to 100° F. will produce approximately 400% supersaturation.

Some of the condensed droplets and their entrained particles settle to the bottom of the vessel where they are removed through drain line 14. The remaining droplets are swept along with the gas stream to flow into mesh demister 36. The droplets are sufficiently large that they are separated from the gas by impingement filtering in the demister. The droplets then flow along the inclined surface of shield 37 to the wall of the vessel. Those droplets on the top of the shield flow out through drain line 38, and the droplets accumulating on the bottom of the shield flow down the walls of the vessel to drain line 14.

The filtered gas passes upward from stage 16 to enter stage 17 where the cycle of humidification, cooling, condensation and filtering is repeated just as described above. Similarly, the gas leaving stage 17 is cycled through stage 18. The use of multiple stages increases the statistical probability that substantially all the particles in the gas stream will become condensation nuclei, and will therefore be entrained in water droplets and removed from the gas.

When the gas passes out of stage 18, it flows through filter 42 before passing through outlet line 13 at the top of the vessel. This final filtering removes any residual droplets remaining in the gas, and is effective on particles down to the usual impingement-filter limit of about 0.1 micron particle size.

The high efficiency of the gas scrubber of this invention is due in part to the mechanics of the condensation process. Water vapor in particle-free air will not begin to condense into droplets until the air is about 800% supersaturated. Condensation begins at much lower levels of supersaturation when liquid or solid particles are present to serve as condensation nuclei. For example, condensation begins at a supersaturation of about 300% on nucleation particles of about 0.001-micron diameter. Even molecular-size particles with diameters substantially smaller than 0.001 micron are satisfactory as condensation nuclei.

When water vapor begins to condense on a particle, the growth process is very rapid. For example, the time for a 0.001-micron-diameter condensation nucleus to grow to visible-droplet size of about one micron is estimated to be less than one-hundredth of a second. This rapid condensation improves the throughput of the gas scrubber as very little time need be allowed for droplet formation once the desired level of supersaturation has been achieved.

An alternative form of the gas scrubber of this invention is shown in FIG. 2. This form includes a vessel 42, inlet line 43, outlet line 44, drain line 45, and filter 46 arranged just as already described in FIG. 1. This form also includes three serially arranged stages 48, 49 and 50.

Each stage includes humidifying means 52 having steam injectors, baffles, temperature sensors and controllers, valve, and plumbing identical to the corresponding structure already described above. In this form, however, the finned cooling sections shown in FIG. 1 are replaced by a liquid scrubbing tray 53 in each stage.

The scrubbing trays are of the conventional bubble-cap type used in fractionating towers and the like. Each tray includes a horizontal support plate 55 secured inside the vessel. Extending through and up from the support plate are a plurality of short pipes 56, each of which is surmounted by a bell-shaped cap 57. An overflow pipe 58 is secured to and extends through the vessel wall to connect to a downcomer 59 which drains into drain line 45. The top of the overflow pipe is located below the tops of pipes 56 and above the bottoms of bell-shaped caps 57. A coolant line 61, through which a coolant may be circulated, extends horizontally across the top of support plate 55. A mesh demister 63 is suspended in the center of the vessel above uppermost stage 50 by an annular shield 64 which slopes inwardly and downwardly from the inner surface of the vessel to the demister.

Each tray is flooded with a liquid such as water to establish a liquid level 66 even with the top of overflow pipe 58. The liquid is cooled by circulating a coolant through line 61. Humidified gas flowing up from humidifying means 52 in each stage passes through pipes 56 and is directed downward by caps 57 to bubble through the liquid. The humidified gas is thereby cooled, and the condensation process already described takes place.

The condensate and entrained particles mix with scrubbing-tray liquid and flow out of the scrubbing trays through the overflow pipes and downcomer into the drain line. The steps of condensation and primary filtering are thus both accomplished in the scrubbing trays. The scrubbing tray is similar to the type used in a conventional bubble-cap column, and, for brevity, need not be described in further detail.

After the gap passes through stages 48, 49 and 50, it flows through demister 63 and filter 46 to outlet 44. The demister and filter provide secondary filtering to remove any remaining liquid droplets in the gas stream by the conventional impingement method already described. The droplets drain from shield 64 and the demister into the scrubbing-tray liquid of stage 50 to drain from the vessel.

Still another form of the invention uses liquid scrubbing trays to humidify the particle-laden gas as well as to cool the humidified gas. Such arrangement is shown in FIG. 3, and is similar to the structure shown in FIG. 2 except the steam injectors and baffles are replaced by a scrubbing tray 70. Steam is circulated through a heating line 71 which extends across the top of the scrubbing-tray support plate. A liquid such as water floods the scrubbing tray to a level 72, and is heated by the steam circulated through the heating line.

Particle-laden gas passes through the hot-liquid scrubbing tray in the manner already described and is thereby humidified. The degree of humidification is controlled by sensing the gas temperature above and below the scrubbing tray with temperature sensors 74, the temperature information being fed to a controller 75 which in turn commands operation of steam-line valve 76. The temperature-sensing and steam-supply system may be identical to the system already described. The particle-laden gas thus bubbles through pairs of scrubbing trays to be cyclically humidified and cooled, the resulting condensate and entrained particles being removed in the cool scrubbing trays, demister and filter.

I claim:
1. A gas scrubber, comprising a closed vessel having an inlet opening to admit a particle-contaminated gas and an outlet opening to deliver scrubbed gas; and a plurality of serially arranged scrubbing stages, each stage comprising injection means disposed between the inlet and outlet openings for injecting steam into the gas, cooling means disposed between the injection means and the outlet opening for cooling the mixed gas and steam whereby the steam condenses in water droplets around the particles which serve as condensation nuclei, a first temperature sensor disposed between the inlet opening and the injection means, a second temperature sensor disposed between the injection means and the cooling means, a controller connected to the first and second temperature sensors, a valve connected to the controller for controlling the amount of steam reaching the injection means, and filter means disposed between the cooling means and the outlet opening for filtering the gas to remove the droplets and the particles entrained in the droplets.

2. A gas scrubber defined in claim 1 which further includes an annular shield having outwardly and downwardly sloping sides disposed between the cooling means and the outlet opening, wherein said filter means is disposed in the center of the annular shield for filtering the gas to remove the droplets and the particles entrained in the droplets, and drain means disposed adjacent the outer edge of the annular shield to drain droplets flowing along the shield.

3. A gas scrubber as recited in claim 1 wherein the cooling means comprises a finned coolant line disposed between the steam injection means and the filter means for cooling the gas-steam mixture whereby the steam condenses in water droplets around the particles which serve as condensation nuclei.

4. A gas scrubber as recited in claim 1 wherein the cooling means comprises a cooled bubble-cap scrubbing tray disposed between the steam injection means and the filter means for cooling the gas-steam mixture whereby the steam condenses in water droplets around the particles which serve as condensation nuclei.

5. A gas scrubber, comprising a closed vessel having an inlet opening to admit a particle-contaminated gas and an outlet opening to deliver scrubbed gas; and a plurality of serially arranged scrubbing stages, each stage comprising a heated bubble-cap scrubbing tray disposed between the inlet and outlet openings for mixing a condensable vapor with gas, cooling means disposed within the closed vessel between the scrubbing tray and the outlet opening for cooling the mixed gas and vapor whereby the vapor condenses in droplets around the particles which serve as condensation nuclei, a first temperature sensor disposed between the inlet opening and the heated bubble-cap scrubbing tray, a second temperature sensor disposed between the heated bubble-cap scrubbing tray and the cooling means, a controller connected to the first and second temperature sensors for controlling the amount of heat being supplied to the heated bubble-cap scrubbing tray, and filter means disposed between the cooling means and the outlet opening for filtering the gas to remove the droplets and the particles entrained in the droplets.

6. A gas scrubber, comprising a closed vessel having an inlet opening to admit particle-contaminated gas and an outlet opening to deliver scrubbed gas; at least one pair of serially arranged bubble-cap scrubbing trays between the inlet and outlet openings, indirect heat exchange means to heat the upstream scrubbing tray, indirect heat exchange means to cool the downstream scrubbing tray whereby the particle laden gas is humidified in the upstream scrubbing tray and cooled and condensed in said downstream scrubbing tray; a first temperature sensor disposed between the inlet opening and the upstream scrubbing tray, a second temperature sensor disposed between the upstream scrubbing tray and the downstream scrubbing tray, a controller connected to the first and second temperature sensors for controlling the amount of heat reaching the indirect heat exchange means, and filter means disposed between said downstream scrubbing tray and the outlet opening for filtering the gas to remove remaining droplets and the particles entrained in said droplets.

7. A method of removing particles from a gas, comprising the steps of:
 measuring the temperature of the gas;
 injecting steam into the gas;
 measuring the temperature of the gas after the injection of steam whereby the difference in the temperature of the gas before and after the injection of steam is utilized to control the amount of steam injected into the gas;
 cooling the gas to supersaturate it whereby some of the steam condenses in droplets around some of the particles which serve as condensation nuclei;
 filtering the gas to remove the droplets and the particles entrained in the droplets;
 measuring the temperature of the filtered gas;
 injecting additional steam into the filtered gas;
 measuring the temperature of the gas after the injection of additional steam whereby the difference in the temperature of the filtered gas before and after the injection of additional steam is utilized to control the amount of additional steam injected into the filtered gas;
 cooling the filtered gas to supersaturate it whereby some of the steam condenses in droplets around at least some of the remaining particles in the filtered gas; and
 re-filtering the filtered gas to remove the droplets and the particles entrained in the droplets.

8. A method of removing particles from a gas, comprising the steps of:
 injecting steam into the gas;
 bubbling the gas-steam mixture through a layer of cooled water contained in a first bubble-cap scrubbing tray whereby the steam condenses in droplets around some of the particles which serve as condensation nuclei;
 injecting additional steam into the gas;
 bubbling the gas-steam mixture through a second bubble-cap scrubbing tray containing a layer of cooled water whereby additional steam condenses in droplets around at least some of the remaining particles; and
 filtering the gas to remove droplets and the particles entrained in the droplets.

9. A method of removing particles from a gas, comprising the steps of:
 (a) measuring the temperature of the gas;
 (b) bubbling the gas containing fine particles through a layer of heated water producing a mixture of water vapor and the gas;
 (c) measuring the temperature of the gas-water vapor mixture whereby the difference in temperature between the gas and the gas-water vapor mixture is utilized to control the amount of heat furnished said layer of heated water;
 (d) bubbling the gas-water vapor mixture through a layer of cooled water whereby the water vapor condenses around some of the particles which serve as condensation nuclei;

(e) repeating steps (a), (b), (c) and (d) at least one additional time; and (f) filtering the gas to remove droplets and the particles entrained in the droplets.

References Cited

UNITED STATES PATENTS

| 2,241,674 | 5/1941 | Mohr, et al. | 261—111 X |
|---|---|---|---|
| 1,169,764 | 1/1916 | Bassert | 55—94 |
| 1,493,579 | 5/1924 | Walter | 55—94 |
| 1,919,197 | 7/1933 | Bulkeley | 261—131 X |
| 2,057,579 | 10/1936 | Kurth | 261—149 |
| 2,217,356 | 10/1940 | Becknell | 261—114 X |
| 2,334,427 | 11/1943 | McGrath | 55—222 X |
| 2,845,444 | 7/1958 | Thomson | 261—114 X |
| 2,953,355 | 9/1960 | Hungate | 261—130 X |
| 3,064,409 | 11/1962 | Schmitt | 55—259 X |
| 3,233,881 | 2/1966 | Smith | 261—114 X |
| 3,261,147 | 7/1966 | Allander | 55—259 X |

FOREIGN PATENTS 25,954  6/1911  Great Britain.

REUBEN FRIEDMAN, *Primary Examiner.*

J. ADEE, *Assistant Examiner.*